United States Patent
Gonzales, Jr.

(10) Patent No.: US 10,122,483 B2
(45) Date of Patent: Nov. 6, 2018

(54) CROWD SENTIMENT DETECTION AND ANALYSIS

(71) Applicant: STUBHUB, INC., San Francisco, CA (US)

(72) Inventor: Sergio Pinzon Gonzales, Jr., San Jose, CA (US)

(73) Assignee: EBAY INC., San Jose, CA (US)

( * ) Notice: Subject to any disclaimer, the term of this patent is extended or adjusted under 35 U.S.C. 154(b) by 13 days.

(21) Appl. No.: 14/614,345

(22) Filed: Feb. 4, 2015

(65) Prior Publication Data

US 2016/0226610 A1  Aug. 4, 2016

(51) Int. Cl.
*H04H 60/33* (2008.01)
*H04H 60/56* (2008.01)
*H04N 21/466* (2011.01)
*H04H 60/63* (2008.01)

(52) U.S. Cl.
CPC .......... *H04H 60/33* (2013.01); *H04H 60/63* (2013.01); *H04N 21/466* (2013.01); *H04N 21/4667* (2013.01)

(58) Field of Classification Search
CPC .................... H04N 21/466; H04N 21/4667
See application file for complete search history.

(56) References Cited

U.S. PATENT DOCUMENTS

| | | | |
|---|---|---|---|
| 2003/0033600 A1* | 2/2003 | Cliff | H04H 60/32 725/12 |
| 2012/0150586 A1* | 6/2012 | Harper | G06Q 30/0204 705/7.33 |
| 2014/0196091 A1* | 7/2014 | Shin | H04N 21/27 725/53 |
| 2015/0035644 A1* | 2/2015 | June | G07C 11/00 340/5.61 |
| 2015/0042447 A1* | 2/2015 | Vogt | G08C 17/02 340/4.41 |
| 2015/0148071 A1* | 5/2015 | Elmore | H04W 4/023 455/456.2 |

* cited by examiner

*Primary Examiner* — Joshua D Taylor
(74) *Attorney, Agent, or Firm* — Maschoff Brennan (57) ABSTRACT

A system or a method is provided to detect crowd sentiments and/or reactions to music, movies, films, performances, speeches, and other presentations. In particular, various types of crowd sensors may be set up in a venue where presentations take place to detect and measure the audience's various reactions to the presentations. The crowd sensors may detect the crowd's reactions to a particular presentation, such as a song, and also may detect the crowd's reactions to various portions of the presentation, such as various parts of the song. The crowd's reactions and sentiment in response to the presentation may be used to analyze crowd sentiment for the presentation or for various parts of the presentation. Further, the system may analyze the crowd's sentiment to establish emerging trends in the type of presentation, such as emerging trends in Hip Hop music, merging trends in romantic films, or the like.

20 Claims, 4 Drawing Sheets

CROWD SENTIMENT DETECTION AND ANALYSIS

BACKGROUND

Field of the Invention

The present invention generally relates to analyzing crowd reactions, and in particular, to systems and methods for implementing crowd sentiment detection and analysis using various sensor devices.

Related Art

Various industries, such as the media industry or the entertainment industry, are interested in discovering the next new and popular trend in music, films, and the like. In order to find or determine emerging trends, surveys or polls are conducted to collect information from customers or from the general public. However, surveys or polls for trends are difficult to set up and compose. Further, people may not respond truly or accurately on surveys or polls to reflect their genuine preferences. Thus, there is a need for a system or a method that detects crowd sentiment and perform emerging trend analysis based on the crowd sentiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or a method may be provided to detect crowd sentiments and/or reactions to various presentations, such as music, movies, films, performances, speeches, and other presentations or content. In particular, various types of crowd sensors may be set up in a venue where presentations take place to detect and measure the audience's various reactions to the presentations. The crowd sensors may detect the crowd's reactions to a particular presentation, such as a song, and also may detect the crowd's reactions to various portions of the presentation, such as various parts of the song. The audience's reactions and sentiment in response to the presentation may be used to analyze crowd sentiment for the presentation or for various parts of the presentation. Further, the system may analyze the crowd's sentiment to predict or establish emerging trends in the type of presentation, such as emerging trends in Hip Hop music, merging trends in romantic films, or the like.

In an embodiment, the crowd sensors may include temperature sensors configured to measure the overall temperature or changes in temperature of the crowd. Increasing temperature may indicate more crowd movement or reaction, such as at a dance club or at a sport stadium. Thus, the system may analyze the temperatures or changes in temperatures to determine crowd sentiments in response to the presentations at the venue.

In an embodiment, the crowd sensors may include audio sensors configured to detect or measure crowd noises or changes in crowd noises. Increasing crowd noises may indicate certain crowd reactions. The system may analyze the changes in crowd noise to determine crowd sentiments. Further, the system may analyze and determine the types of crowd noises, such as cheering vs. booing, to determine the type of crowd sentiment.

In an embodiment, the crowd sensors may include vibration sensors configured to detect vibrations produced by the crowd. Increasing vibrations may indicate more activities or reactions from the crowd, such as from dancing, jumping, or the like. Thus, the system may analyze the vibrations or patterns of vibrations and determine crowd sentiment accordingly.

In an embodiment, the crowd sensors may include wearable devices worn by one or more people in the crowd. The wearable devices may include sensors configured to measure various biochemistry conditions of the user, such as body temperature, heart rate, heart beats, skin conductance, and the like. These biochemistry conditions or changes in biochemistry conditions of the users in the crowd may be used to determine crowd sentiments.

In an embodiment, the crowd sensors may include cameras or optical sensors configured to detect size, position, postures, and/or movements of the crowd. Image processing techniques may be used to analyze and determine crowd reactions or conditions based on the images captured at the crowd. Thus, the system may analyze the captured images or motions to determine crowd sentiments. In an embodiment, the crowd sensors may include a combination of different types of sensors to provide more accurate detection of crowd sentiments in response presentations.

In an embodiment, the system may predict or determine emerging trends in music, film, movie, politics, shows, entertainment, sport, fashion, or the like based on the detected crowd sentiments. The crowd sentiments may be dependent or based on the type of presentation. For example, loud noises at a rock concert may indicate an engaged or interested in crowd, while loud noises at a ballet recital may indicate a disinterested crowd (e.g., crowd talking to others during performance, etc.). In another example, smart phone usage or other wearable device usage during a presentation may infer some level of disinterest for the presentation or a specific portion of the presentation. As such, merchants, service providers, investment entities, or the like may anticipate business trend or inventory trend based on the emerging trends. For example, merchants may determine how much inventory to keep and public venue operators may determine how many people to expect for an event.

Figure 1:
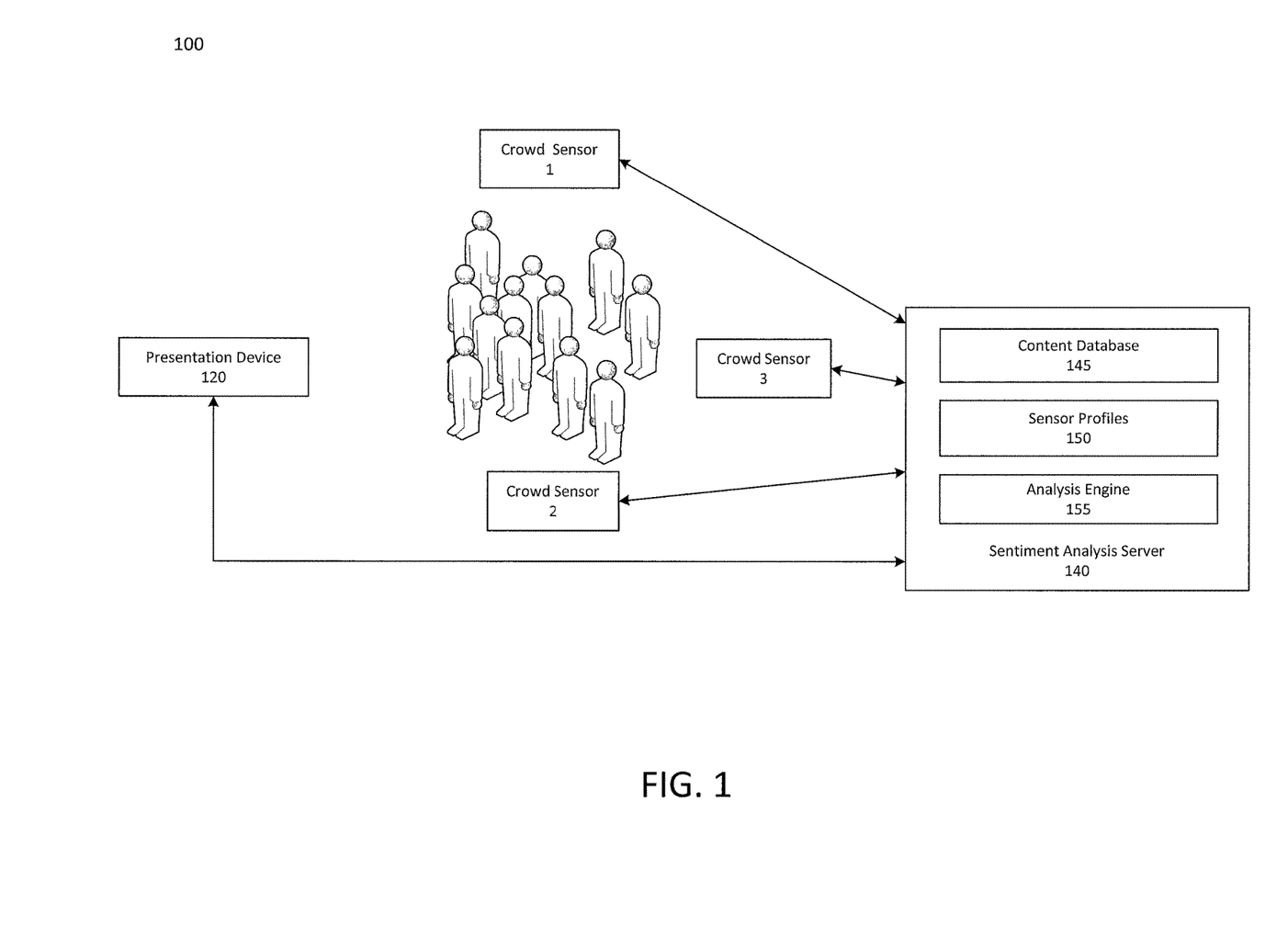
FIG. 1 is a block diagram of a system suitable for implementing processes for crowd sentiment detection and analysis according to an embodiment.

FIG. 1 is a block diagram of a system 100 configured to implement detection and analysis of crowd sentiments in accordance with an embodiment of the invention. System 100 may comprise or implement a plurality of servers, devices, and/or software components that operate to perform various transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers or devices illustrated in FIG. 1 may be deployed in other ways and that the operations performed and/or the services provided by such servers or devices may be combined or separated for a given implementation and may be performed by a greater number or fewer number of servers or devices. One or more servers may be operated and/or maintained by the same or different entities.

System 100 may include a presentation device 120, crowd sensors 1, 2, and 3, and a sentiment analysis server 140. The presentation device 120 may be operated by or maintained by a presentation service provider or by an operator of a presentation venue, such as a movie theater, a stadium, a concert hall, or the like. The presentation device 120 may be configured to present or broadcast various presentations to the crowd gathered at a public venue. The presentation may be a game at a sport stadium, a live band at a concert, a DJ at a club, a movie at a movie theater, a news or information session at a news conference, and the like.

Presentation device 120 and sentiment analysis server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over a communication network.

The presentation device 120 may include displays, speakers, projectors, screens, and the like that are configured to present audio, video, or textual information to the crowd. The presentation device 120 may also include microphones, cameras, and the like that capture presentations or performances by live persons or live events. The presentation device 120 may then broadcast the presentation to the audience. In some embodiments, the presentation device 120 may capture the audio, video, image, or textual presentations and may communicate the presentations to the sentiment analysis server 140 for analysis.

Crowd sensors 1, 2, and 3 may be set up at various positions or locations near the audience to detect the audience's various reactions or responses to the presentations. For example, crowd sensors may include audio sensors configured to detect noises or various audible reactions in response to the presentation. In another example, crowd sensors may include cameras configured to capture positions, size, postures, movements, and/or compositions of the crowd. In still another example, crowd sensors may include vibration sensors configured to capture vibrations resulted from movements of the crowd. In yet another example, crowd sensors may include temperature sensors configured to detect temperatures or changes in temperature of the crowd in response to the presentation. Other sensors, such as biometric sensors of wearable devices worn by people in the crowd, infrared sensors or camera for detecting heat signatures of the crowd, optical sensors for detecting various postures or movements of the crowd also may be implemented as crowd sensors. In some embodiments, a combination of different types of crowd sensors may be implemented together to provide a comprehensive picture of the crowd in response to the presentation.

The sentiment analysis server 140 may be maintained by a sentiment analysis service provider, an operator of a public venue, or any entity who implements crowd sentiment analysis. The sentiment analysis server 140 may be implemented at a venue where presentations to a crowd take place, such as at a concert hall, a stadium, a classroom, a conference center, a bar, a club, or the like. In some embodiments, the sentiment analysis server 140 may be implemented remotely from the venue where the presentation or the crowd is located.

The sentiment analysis server 140 may collect various sensor signals from the crowd sensors 1, 2, and 3. In particular, the crowd sensors may detect various crowd reactions and may generate sensor signals based on the crowd reactions. The sensor signals may be communicated to the sentiment analysis server 140. The sentiment analysis server 140 also may capture and/or receive presentation data from the presentation device 120. For example, presentation captured or presented from the presentation device 120 may be communicated to the sentiment analysis server 140. The presentation may be a song, a musical piece, an image, a moving picture, a speech, a textual presentation, a live performance, and the like.

The sentiment analysis server 140 may include a content database 145 configured to store a library of various presentations, such as various music, song, speeches, shows, movies, advertisements, live performances, and the like. The various presentations may be collected from the producers of the presentations or from attendees or operators of presentation venues who recorded the presentations. The content database 145 may organize the various presentations by location, performer, producer, genre, categories, time, date, versions, and the like. For example, a particular song may have different versions performed by different performers at different locations or venues.

The sentiment analysis server 140 may include sensor profiles 150. A sensor profile 150 may include information of various crowd sensors at a venue. Each performance venue may have a unique sensor profile including information regarding the crowd sensors implemented at the performance venue. The sensor profile may include the location of the venue, the type of venue, the number and composition of crowd sensors at the venue, the types of crowd sensors, respective locations of crowd sensors within the venue, specification of the crowd sensors, such as models of sensors, sensing range, output sensing signals, and the like. In some embodiments, a map of the venue may be included in the sensor profile depicting the positions of the presentation device 120, crowd location, and various crowd sensors within the venue. Thus, the sensor profile may provide a comprehensive picture of a presentation venue's capabilities for detecting the crowd and/or reactions of the crowd in response to the presentations.

The sentiment analysis server 140 also may include an analysis engine 155. The analysis engine may include applications and/or processors configured to implement crowd sentiment analysis. In particular, the sentiment analysis server 140 may receive and collect sensor signals from crowd sensors. The sensor signals may be mapped to a presentation and may be analyzed to determine the crowd sentiment for the presentation or for various parts of the presentation.

Figure 2:
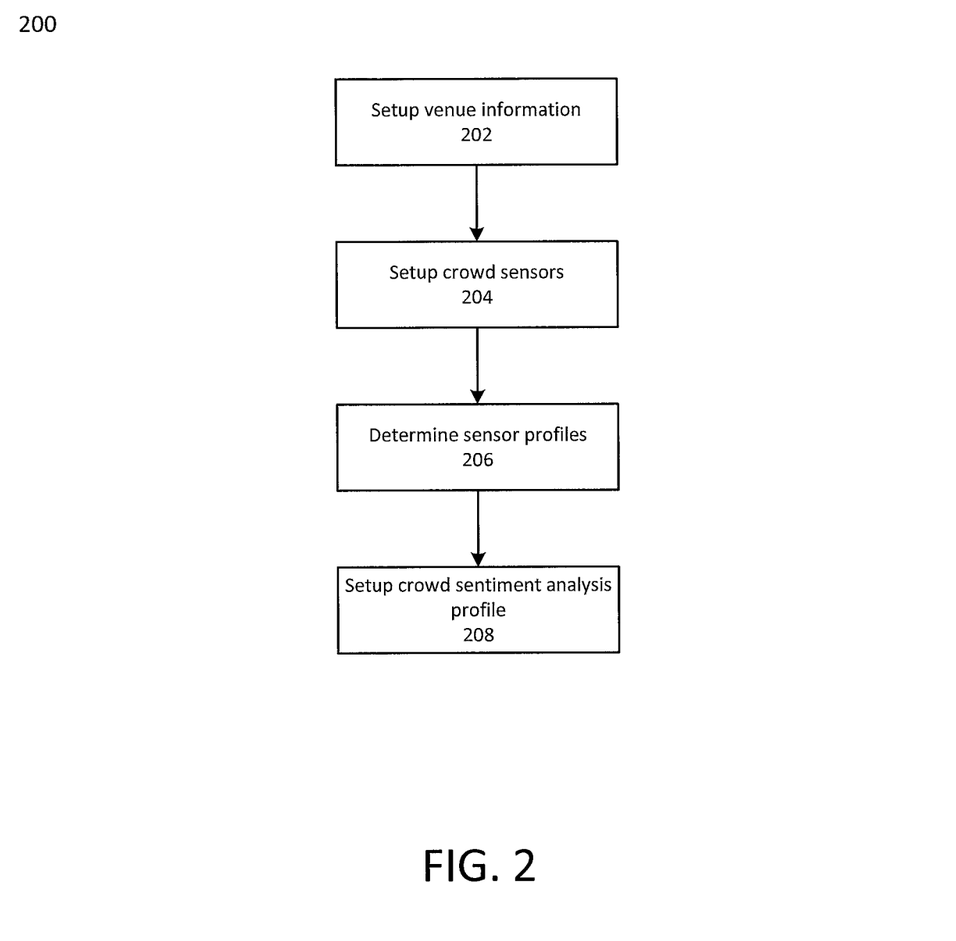
FIG. 2 is a flowchart showing a process for setting up a system for crowd sentiment detection and analysis according to one embodiment.

FIG. 2 is a flowchart showing a process 200 for setting up crowd sentiment detection and analysis according to one embodiment. At step 202, the sentiment analysis server 170 may set up the venue information. In particular, the sentiment analysis server 170 may collect information of the venue where crowd sentiment is to be detected and analyzed. For example, the operator of the venue may provide information regarding the venue to the sentiment analysis server 170. The venue information may include the name of the venue, the type of venue, the location of the venue, the type of performance presented at the venue, operating hours of the venue, capacity of the venue, and the like. The venue information also may include a map of the venue depicting the layout and various components at the venue, such as location of the performance stage, location of sound equipment, display equipment, audience area, such as standing area and/or seating area, entrance, exit, amenities, such as food or drink area, restrooms, and the like.

At step 204, the system may set up the crowd sensors at the venue. The crowd sensors may be set up by the operator of the venue or by the crowd analysis service provider. Different types of crowd sensors may be provided based on the type and the specific setup of the venue, as well as the type of presentation(s) at the venue. For example, the types and locations of the crowd sensors may be determined based on the layout of the venue, the type, location, arrangement, and size of crowd area at the venue, the location and arrangement of other crowd accessible areas, the location and arrangement of the presentation device, location and arrangement of components that may interfere with the crowd sensors, and the like.

For example, audio sensors for detecting noises may be placed above where people sit or stand to pick up the noises produced by the crowd. Multiple audio sensors may be installed to form a grid of audio sensors to provide a comprehensive audio detection of the crowd. The size and shape of the grid may correspond to the size and shape of the crowd area. The audio sensors may be positioned and oriented in a direction such that they minimize feedback or minimize picking up interference from other sources, such as the presentation itself or outside traffic.

In another example, cameras for capturing images or movements of the crowd may be placed along the peripheral of the crowd area to capture the images or movements of the crowd from the front, rear, top, and/or sides of the crowd area. The cameras may capture images or movement of the crowd for determining the size of the crowd, postures, movements, or any reactions of the crowd. In some embodiments, motion sensors may be used to capture the presence and/or movements of the crowd. For example, motion sensors may be installed above where people stand or sit or below where people stand or sit underneath the floor.

Crowd sensors may include vibration sensors configured to detect vibrations produced by the crowd. For example, vibration sensors may be installed on the floor where the crowd is located to detect leg movements of the crowd, such as dancing, jumping, or the like. In another example, crowd sensors may include an optical sensor installed directly above the crowd to detect the hands of the people when they raise their hands or the heads of the people when they stand or when they jump. Olfactory sensors also may be used to detect the smell or scent of the crowd, such as smell of sweat indicating activities and excitement. Various other sensors also may be used to detect particular posture or movement of the people in the crowd.

In still another example, temperature sensors may be provided in or near the crowd area to capture temperature or changes in temperature produced by the crowd. Control temperature sensors may be provided separated from the crowd to detect temperatures produced by other sources, such as by the air conditioning unit or by outside weather. Thus, the detection from the control temperature sensors may be used to eliminate external factors other than the temperature of the crowd that may affect the temperature at the venue. In some embodiments, infrared cameras may be used to capture heat images or temperature gradient images of the crowd to detect the temperature or changes in temperature of the crowd.

In an embodiment, the consumption of various materials or elements may be used to analyze the reactions of the crowd to the presentation. For example, the system may access the amount or inventory of food or drinks to determine how much and how fast the food or drinks are consumed by the crowd for crowd sentiment analysis. In another example, the crowd sensors may include oxygen level sensors configured to detect the level of oxygen in the air. Thus, the amount of oxygen or the consumption rate of the oxygen used up by the crowd may be measured and be used for crowd sentiment analysis. In still another example, the water usage, such as at the restrooms in the venue, may be used to determine crowd sentiment. Other environmental factors, such as traffic patterns in the venue, traffic patterns near or around the venue, e.g., traffic patterns near a stadium, may be used to analyze crowd sentiment toward the presentation at the venue.

In some embodiments, body chemistry conditions detected by wearable devices worn by one or more people in the crowd may be used to analyze crowd sentiment. For example, some people in the crowd may wear wearable devices with sensors configured to detect various body chemistry conditions, such as heart rate, body temperature, skin conductance, and other body chemistry conditions. The wearable devices may communicate the body chemistry conditions to the sentiment analysis server 140. The body chemistry conditions of one or more of the people in the crowd may then be used for crowd sentiment analysis.

Thus, various types of crowd sensors may be used to detect various conditions of the crowd. The crowd conditions may be communicated to and collected by the sentiment analysis server 140 for crowd sentiment analysis. A combination of various types of crowd sensors may be used for a venue. The number, composition, combination, or arrangement of the crowd sensors may be customized for a particular venue based on the type, size, shape, and layout of the particular venue.

At step 206, the system may determine a sensor profile for the venue based on the number, composition, and arrangement of the crowd sensors installed at the venue. In particular, based on the types and/or models of the sensors installed at the venue, the system may determine the sensor signals to be output from the sensors and the context and meaning indicated by the sensor signals. For example, a performance venue may include a camera installed above the dance floor and vibration sensors installed underneath the dance floor. The system may determine that the camera outputs images of the crowd captured from above the crowd and the images may indicate the size and movement of the crowd. Thus, the system may utilize the images captured to determine the size and movement of the crowd. The system also may determine that the sensor signals output from the vibration sensors indicate leg movement of the crowd. As such, great sensor signals from the vibration sensors indicate greater movement and excitement from the crowd. The system also may determine greater crowd sentiment when vibrations detected at the vibration sensors synchronize with the rhythm of the presentation, indicating that the crowd is moving according to the presentation. Thus, the sensor profile may include a profile of the various crowd sensors installed at the venue and their respective capabilities. The sensor profile also include information on what type of sensor signals are output from the respective crowd sensors and the meaning or context of the sensor signals with respect to crowd sentiment.

At step 208, the system may set up crowd sentiment analysis profile. Based on the sensor profile and the type and/or setup of the venue, the system may determine a crowd sentiment analysis profile for the venue. The crowd sentiment analysis profile may include various factors related to the venue, such as the type, the size, the layout, the location, the type of performances presented, or any other factors related to the venue that may affect the crowd analysis. Thus, the system may give weights to the sensor signals output from the various sensors based on the factors related to the venue. For example, sensors installed at a type of venue where the crowd is seated may be weighted more than sensors installed at a type of venue where the crowd is standing. This is because the crowd responses may be less pronounced at the type of venue where the crowd is seated than the type of venue where the crowd is standing. In another embodiment, based on the type of performances presented at the venue, the crowd response may be weighted. For example, the crowd responses at a classical concert may be less pronounced than the crowd response at a rock concert or at a sports event. As such, a crowd response at a classical concert may be given more weight than those at a rock concert or at a sport event.

Responses may vary or imply different crowd interest or engagement based on the type of performance and/or content or presentations within a performance. For example, disinterest may be determined when there is a lot of smart phone usage not related to the performance (such as checking emails), low noise (such for a rock concert during a rock song), high noise (such as during a symphony or during a ballad), crowd movement away from the performance (such as to a concession stand), etc. High interest may be determined where there is a lot of smart phone usage related to a performance (taking photos, sending photos, texting photos), a lot of movement in an area such as a dance floor during a particular song, etc.

In an embodiment, the crowd sentiment may be determined based on one or more of a type of the presentation, a location of the presentation, and a time of the presentation. For example, crowd reaction to a specific event may be different due to local behavior, e.g., dance club reaction may be different in a small Midwestern town vs. in Ibiza. Further, crowd reactions may be different at the beginning of a show vs. at the end of a long event (e.g., at 4 a.m.). In another example, crowd reactions may be different at a jazz concert vs. a rock concert. Accordingly, the system may provide appropriate weight to the detections at the crowd sensors to reflect the type, the location, and/or the time of the presentation.

Environmental factors related to the venue also may be taken into consideration to provide appropriate and accurate picture of the crowd sentiment. For example, the sensor signals of temperature sensors at a venue may be calibrated or adjusted based on the layout or the operation of the air conditioning system at the venue. In still another example, the sensor signals of the audio sensors at a venue may be adjusted or calibrated in view of the layout and operation of audio output devices, such as speakers, subwoofers, and other sound equipment that may interfere with the detection of crowd response by the audio sensors. Accordingly, a crowd sentiment analysis profile may be customized and set up for a venue to provide a comprehensive and accurate picture of crowd responses detected by the various crowd sensors at the performance venue.

By using the above process 200, various crowd sensors may be set up for a presentation venue to detect various types of crowd responses at the presentation venue. A sensor profile may be set up to define the specification and capabilities of the crowd sensors installed at the presentation venue. Further, a crowd sentiment analysis profile may be set up to provide context and meaning to sensor signals output from the crowd sensors. Various factors related to the venue also may be considered for providing context to the sensor signals output from the crowd sensors.

Figure 3:
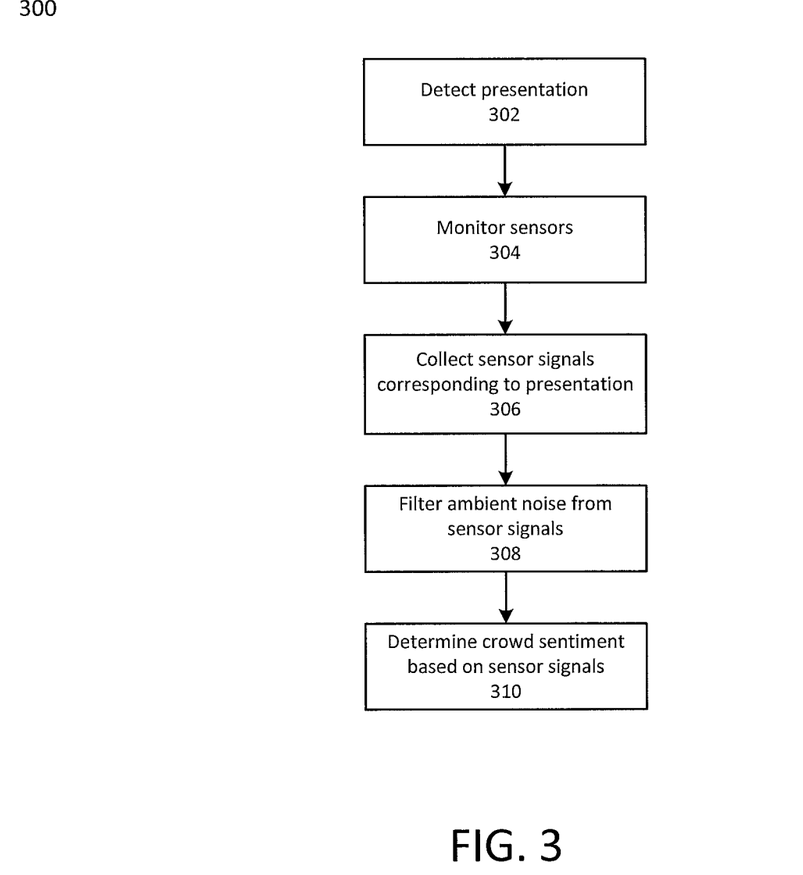
FIG. 3 is a flowchart showing a process for crowd sentiment detection and analysis according to one embodiment.

FIG. 3 is a flowchart showing a process 300 for implementing detection and analysis of crowd sentiment according to one embodiment. At step 302, the system may detect a presentation at a venue. In particular, the presentation device 120 or the sentiment analysis server 140 may detect when a presentation is taking place at a venue. The presentation may be a live performance, a speech, a film, a composition of music by a disc jockey (DJ), an advertisement, or any type of presentation. The audio and/or video of the performance may be captured by the presentation device 120 or by the crowd sensors and may be communicated to the sentiment analysis server 140.

The sentiment analysis server 140 may analyze the audio and/or video presentation to identify and/or determine the type and/or name of presentation. In particular, the sentiment analysis server 170 may analyze the audio and/or video signal patterns of the presentation to determine the audio/video pattern signature of the presentation, such as a frequency and amplitude vs. time signatures of the signal pattern. The sentiment analysis server 140 may compare and match the pattern signature with those in the content database 145 to attempt to identify the type or name of the presentation. For example, the presentation may be a song performed by a live band. The sentiment analysis server 140 may attempt to find the name, the author, the performer, or other information about the song. In some embodiments, the information regarding the presentation may be provided by the performer or by the operator of the venue. As such, the sentiment analysis server 140 may simply search the content database 145 by the name or the performer of the presentation to find the presentation.

The sentiment analysis server 140 may store various presentation profiles in the content database 145. Each presentation profile may store a presentation, such as a song, a film, or the like. A presentation may have various versions and may be performed by different performers at various venues. For example, a song may have different styles or versions and may be performed by different music bands or artists at different venues. Crowd sentiment from the various performances may be collected and stored with the presentation profile for the same presentation. As such, crowd responses from different performances at different venues may be collected and aggregated for the same presentation at the presentation profile.

At step 304, the system may monitor sensor signals output from the crowd sensors during the presentation. In an embodiment, the sensor signals may be streamed in real time to the sentiment analysis server 140. In some embodiments, the sensor signals may be collected and may be sent to the sentiment analysis server 140 as a data file after the presentation.

At step 306, the system may collect sensor signals corresponding to presentation. In particular, the system may monitor the presentation in parallel with the sensor signals and may map the sensor signals to the corresponding portions of the presentation. For example, the sensor signals may be time stamped or time mapped to the presentation to reflect the crowd responses during different time portions of the presentation. As such, various sensor signals from various crowd sensors may be synchronized to the presentation by time.

At step 308, the system may filter ambient noises from sensor signals. In particular, based on the sensor profile of the venue, the sentiment analysis server 140 may determine the number, the composition, the types, and the specification of the crowd sensors installed at the venue. Further, based on the crowd sentiment analysis profile of the venue, the sentiment analysis server 140 may provide meaning and context to the sensor signals output from the crowd sensors at the venue.

The sentiment analysis server 140 may calibrate and/or filter the sensor signals to filter out or adjust for signal noises that are not produced by the crowd. For example, control temperature sensors may be installed at the venue to monitor environmental factors, such as change in temperature resulting from changes in weather or from the operation of the air conditioning system. Control vibration sensors may be installed near or away from the crowd to capture vibrations produced by other sources, such as by people or traffic passing by who are not attending the presentation. Other types of control sensors also may be deployed to detect other external sources that may interfere with the detection of crowd responses. The sentiment analysis server 140 may filter the noises detected by the control sensors from the sensor signals of the crowd sensors.

The sentiment analysis server 140 also may assign appropriate weights to the sensor signals based on the type and arrangement of the crowd sensors and the type and context of the venue as defined in the crowd sentiment analysis profile. For example, crowd sensors that are positioned closer to the audience may be given more weight. In another example, for the same song, the sentiment analysis server 140 may give more weight to crowd responses at a casual club than crowd responses at a crowded pop concert. In still another example, for the same movie, the sentiment analysis server 140 may give less weight to the crowd response detected on the movie's opening day than to the crowd response detected a week after the opening day, because the crowd may be more excited because of the opening day, but not because of the movie itself. Accordingly, the sentiment analysis server 140 may filter out noises produced by external sources and/or external factors.

At step 310, the system may determine crowd sentiment based on sensor signals. In particular, the sentiment analysis server 140 may calculate a sentiment score based on the sensor signals received from the crowd sensors. The sensor signals from different crowd sensors and different venues may be weighted differently based on the sensor profiles and the crowd sentiment analysis profile of the venues.

A sentiment score may be calculated based from the sensor signals. As noted above, sensor signals from different crowd sensors may be weighted differently based on the crowd sensor and the venue. The sensor signals from each crowd sensor may contribute to the sentiment score. For example, a sentiment point may be determined for the sensor signal from each crowd sensor and the sentiment points from the crowd sensors at the venue may be aggregated to result in the sentiment score for the presentation at the venue.

The sentiment score may vary for different portions of the same presentation. As such, the crowd sentiment for different portions of the presentation may be reflected by the change in sentiment score throughout the presentation. Based on the changes in sentiment score, portions of the presentation that elicit greater responses from the crowd may be identified. For example, the sentiment score may indicate that a certain portion of a song elicit greater responses from the crowd. This may be confirmed by the fact that the same pattern of crowd response is observed in different performances or different versions of the song.

The sentiment analysis server 140 may also calculate an overall sentiment score for a presentation. For example, sentiment scores measured throughout the presentation may be averaged to derive the overall sentiment score for the presentation. The sentiment score for a presentation may be used to compare the crowd sentiment for a presentation with other presentations. For example, sentiment scores for the different presentations of the same song may be compared to determine which version or which presentation elicits more crowd response or crowd sentiment. The system may then determine which version or which performance venue is preferred by the crowd for the same song.

The sentiment analysis server 150 may also analyze and compare sentiment scores between different presentations or different types of presentations. In particular, the sentiment analysis server 140 may analyze and compare different presentations to identify patterns or trends that are preferred by the crowd. For example, the system may identify emerging trends of the type or style of music. Further, the system may identify emerging trends in artist, subject matter, lyrics, melodies, rhythms, storyline, plots, and the like. Different geographical regions may have different trends. Further, the system may identify the progress and propagation of trends in and among different geographical regions.

In another example, the system may identify emerging trends in moving pictures, such as in TV shows, movies, films, live shows, and the like. The system may identify emerging trends in story plots, scenes, image styles, presentation styles, and the like. In still another example, the system may identify emerging trends in sports and entertainment. For example, the system may identify emerging trends in game strategy, sports team, and the like.

The system may utilize the emerging trends in crowd sentiment to predict and determine various business operations or investment strategies. For example, emerging trends in music or film may allow producers of presentations to direct more fund or effort in certain style of music or film Merchants or manufacturers also may determine or anticipate inventory or production capacity based on emerging trends. Investment entities also may determine future investment opportunities based on the emerging trends in crowd sentiment.

Accordingly, the above processes 200 and 300 may implement crowd sentiment detection and analysis for various types of presentations at different performance venues. In particular, various types of crowd sensors may be implemented to detect different aspects of the crowd conditions and/or reactions in response to presentations. The crowd conditions and/or reactions detected at different presentations and/or at different performance venues may be analyzed and compared to identify and/or determine trends or patterns in crowd sentiment. Emerging trends or patterns in crowd sentiment for various presentations may be used to forecast, predict, or anticipate business or investment trends.

Figure 4:
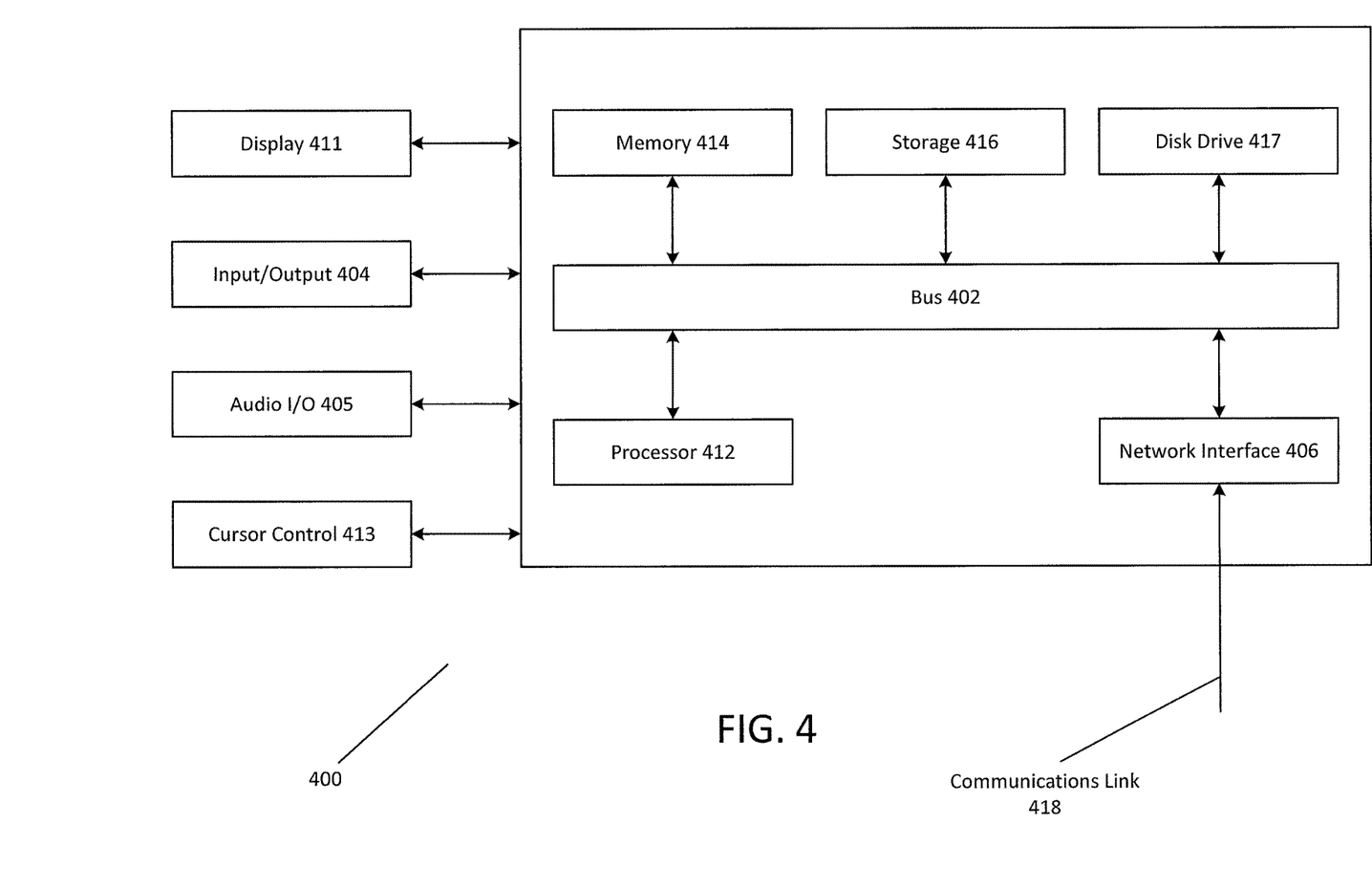
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the sentiment analysis server may comprise a personal computing device (e.g., smart phone, a computing tablet, a personal computer, laptop, PDA, Bluetooth device, key FOB, badge, etc.) capable of communicating with a communication network.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
one or more processors adapted to:
receive one or more sensor signals output from one or more crowd sensors detecting crowd conditions in an audience in response to an event taking place at a venue;
determine a type of the event based on the one or more sensor signals;
assign weights to the one or more sensor signals based on a type of the venue and the type of the event;
detect mobile device usage of users in the audience operating mobile devices to capture and communicate the event to others; and
determine a crowd sentiment based on: the mobile device usage of the users in response to the event; the crowd conditions; the type of the venue; and the type of the event.

2. The system of claim 1, wherein the one or more crowd sensors comprise one or more audio sensors configured to detect noise produced by the audience during the event, and wherein the one or more processors are further adapted to determine the crowd sentiment of the audience based on a level and a type of the noise produced by the audience in response to the event.

3. The system of claim 2, wherein the one or more processors are further adapted to determine a higher crowd sentiment based on a higher level of noise produced by the audience.

4. The system of claim 3, wherein the one or more processors are further adapted to determine a positive or a negative crowd sentiment based on the type of the noise produced by the audience.

5. The system of claim 1, wherein the one or more crowd sensors comprise one or more cameras configured to capture images of the audience during the event, and wherein the one or more processors are further adapted to determine the crowd sentiment of the audience based on one or more of a size, a position, and a movement of the audience.

6. The system of claim 1, wherein the one or more crowd sensors comprise one or more vibration sensors configured to detect ground vibrations produced by the audience during the event, and the one or more processors are further adapted to determine the crowd sentiment of the audience based on the ground vibrations.

7. The system of claim 1, wherein the one or more crowd sensors comprise one or more optical sensors configured to detect one or more of a position, a posture, and a movement of the audience during the event, and the one or more processors are further adapted to determine the crowd sentiment of the audience based on the one or more of the position, the posture, and the movement of the audience.

8. The system of claim 1, wherein the one or more crowd sensors comprise one or more temperature sensors configured to detect temperatures of the audience during the event, and the one or more processors are further adapted to determine the crowd sentiment of the audience based on changes of temperature of the audience during the event.

9. The system of claim 1, wherein the one or more crowd sensors comprise one or more wearable devices worn by one or more persons in the audience, the one or more wearable devices comprising one or more sensors configured to detect a body chemistry condition of the one or more persons, and wherein the one or more processors are further adapted to determine the crowd sentiment of the audience based on the body chemistry condition of the one or more persons detected by the one or more wearable devices during the event.

10. The system of claim 1, wherein the one or more crowd sensors comprise one or more sensors configured to measure a rate of consumption of one or more of: a water, a food, a drink, or an oxygen level by the audience, and wherein the one or more processors are further adapted to determine the crowd sentiment of the audience based on the rate of consumption.

11. A method comprising:
receiving one or more sensor signals output from one or more crowd sensors detecting crowd conditions in an audience in response to an event taking place at a venue;
determining a type of the event based on the one or more sensor signals;
assigning weights to the one or more sensor signals based on a type of the venue and the type of the event;
detecting mobile device usage of users in the audience operating mobile devices to capture and communicate the event to one or more others; and
determining a crowd sentiment based on: the mobile device usage of the users in response to the event; the crowd conditions; the type of the venue; and the type of the event.

12. The method of claim 11, further comprising determining a sentiment score for the event based on the one or more sensor signals, wherein the sentiment score indicates a level of the crowd sentiment in response to the event.

13. The method of claim 12, further comprising:
determining a sentiment point for each sensor signal;
assigning a weight to the sentiment point of each sensor signal based on a crowd sentiment analysis profile of the venue defining context and meaning of each sensor signal and a sensor profile of the one or more crowd sensors defining a number and a composition of the one or more crowd sensors installed at the venue; and
aggregating the sentiment point of each sensor signal to determine the sentiment score for the event.

14. The method of claim 12, further comprising:
monitoring changes in the sentiment score during the event; and
determining the crowd sentiment of the audience during different portions of the event based on the changes in the sentiment score.

15. The method of claim 11, further comprising:
comparing sentiment scores of various events; and
determining emerging trends among the various events based on the comparison.

16. The method of claim 15, where in the emerging trends comprise one or more of an emerging type of event, an emerging rhythm in music, an emerging melody in music, an emerging story plot in film, an emerging subject matter, or an emerging performance style.

17. The method of claim 15, further comprising determining a business strategy or an investment strategy based on the emerging trends.

18. The method of claim 11, further comprising:
determining that the mobile device usage of the users in the audience is related to the event; and
determining a positive crowd sentiment based on the mobile device usage related to the event.

19. The method of claim 11, further comprising:
determining that the mobile device usage of the users in the audience is not related to the event; and
determining a negative crowd sentiment based on the mobile device usage not related to the event.

20. The method of claim 11, further comprising:
receiving at least one sensor signal detected by one or more control sensors during the event, wherein the one or more control sensors detect environmental noises that interfere with the crowd conditions detected by the one or more crowd sensors; and
filtering the environmental noises from the sensor signals received from the one or more crowd sensors.

* * * * *